Patented Sept. 5, 1950

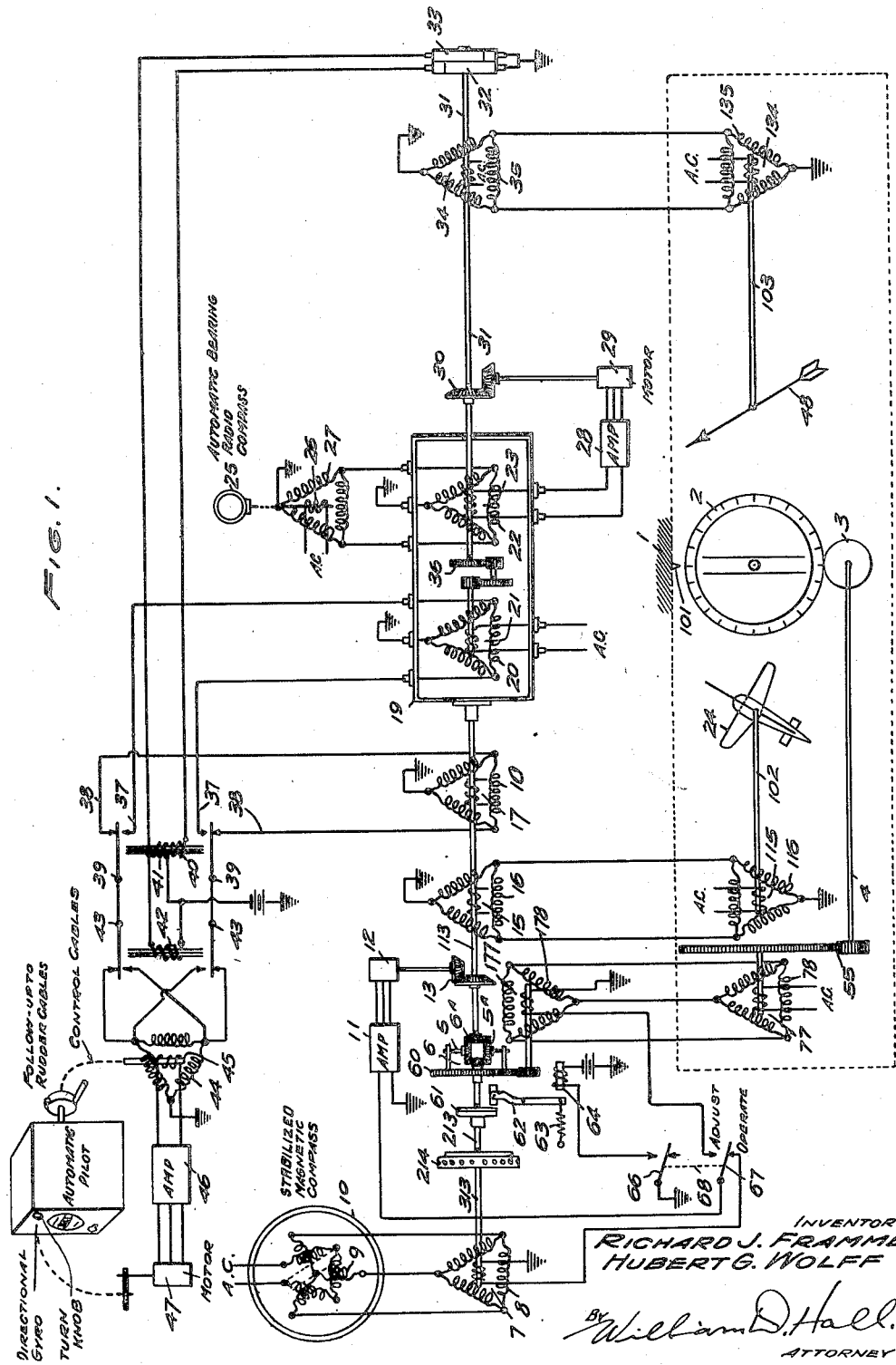

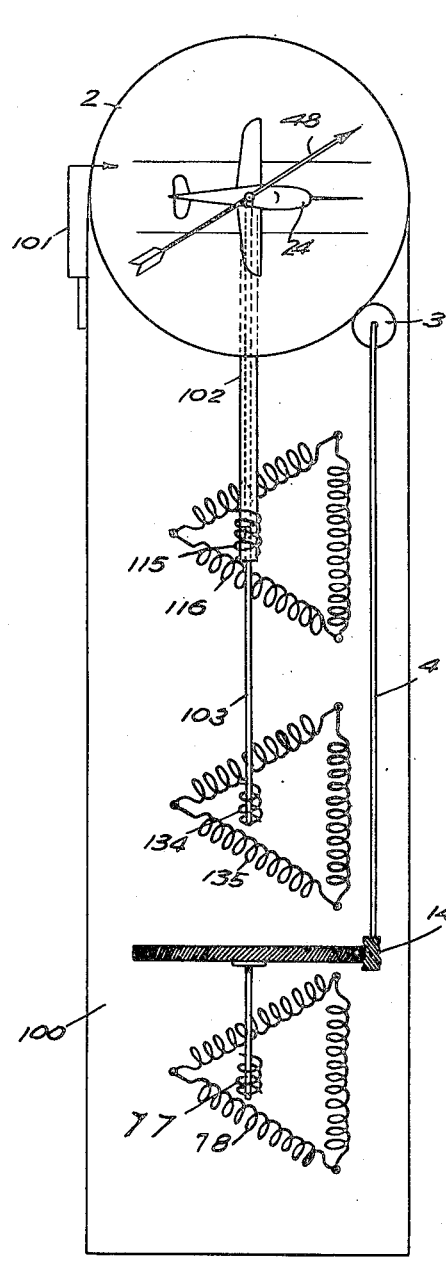
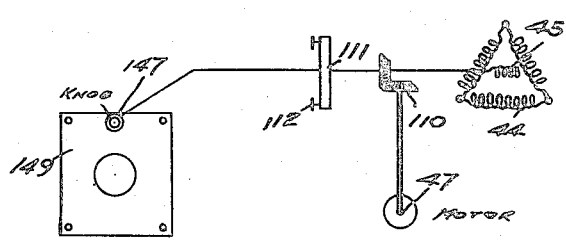
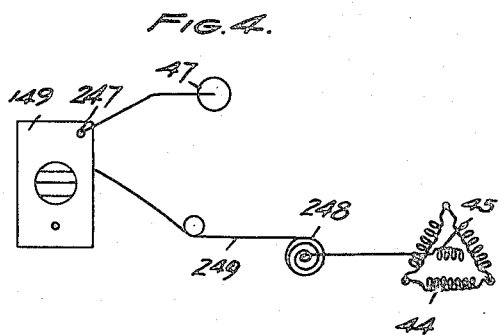
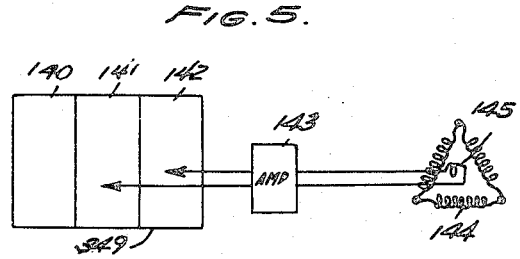

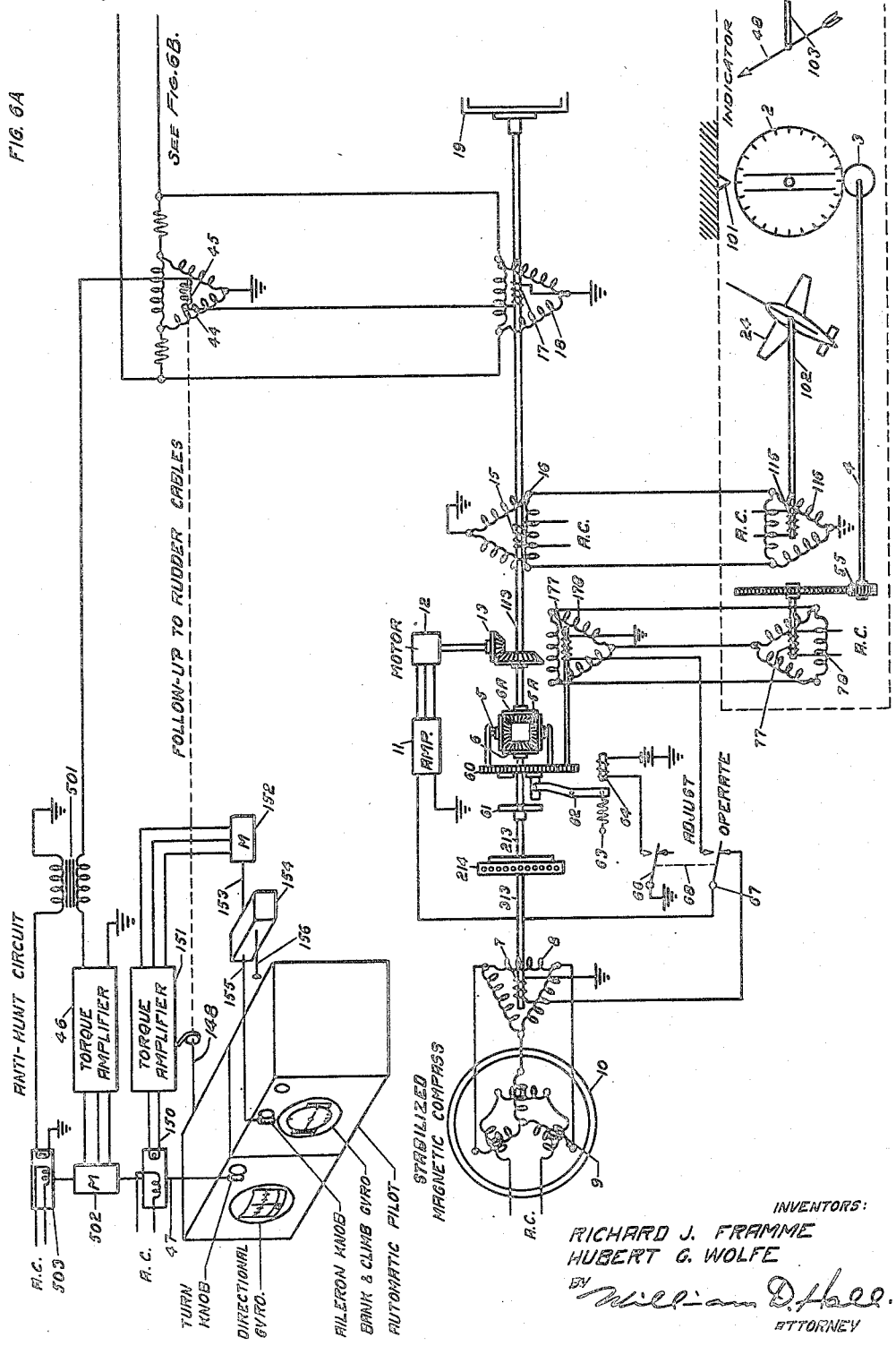

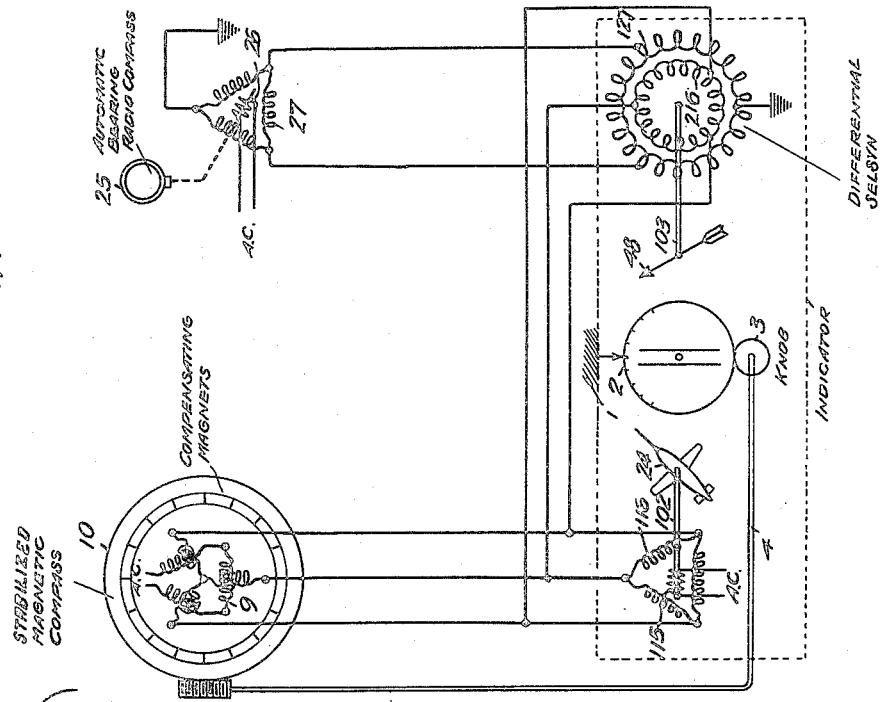

2,520,922

UNITED STATES PATENT OFFICE 2,520,922

AUTOMATIC NAVIGATOR AND INDICATOR

Richard J. Framme and Hubert G. Wolff,
Dayton, Ohio

Application May 25, 1943, Serial No. 488,340

4 Claims. (Cl. 318—489)

(Granted under the act of March 3, 1883, as
amended April 30, 1928; 370 O. G. 757)

The invention described herein may be manufactured and used by or for the Government for governmental purposes, without the payment to use of any royalty thereon.

This invention relates to an automatic navigation and indication device which compensates for wind drift in such a manner that the track of the controlled aircraft (but equally applicable to other types of dirigible vehicles) is approximately a straight line. Our improved device provides means whereby the pilot of the aircraft on which the device is mounted may tune in a radio station and preselect a desired course through (either toward or away from) the radio station. When connected to the controls of the aircraft, our improved device will cause the aircraft to head towards the desired course until the craft is "on course" then will steer the aircraft so that its track corresponds to the desired course regardless of the wind or its direction. While our device is steering the aircraft it also provides a visual check of the performance, by means of indicators which form a part of our device. Our automatic device will cause the aircraft to move in a substantial drift-free manner along the preselected course. If the aircraft deviates from the desired course, it is caused to return to the desired course. If the deviation from course is more than a predetermined amount (22½ degrees for this illustration) the automatic device causes the aircraft to return to the desired course by moving at an angle as great as 90° to the desired course. If the deviation from course is less than 22½ degrees, our device will cause the aircraft to approach the course asymptotically and the heading will be approximately four times the angle off course.

It is an object of our invention to provide a device which, when connected to the steering mechanism of a dirigible vehicle, such as an airplane, boat or land conveyance, will cause the vehicle when motivated to proceed to any preset course in the shortest possible manner, and along the preset course in such a manner that its track is a straight line and substantially unaffected by wind drift, while at the same time providing navigational indication.

It is an object of our invention to provide a device for the automatic control of a dirigible vehicle, such as an aircraft, boat or land conveyance, in which there are provided manually operable means for adjusting the zero position of a device controlled by a gyro-stabilized magnetic compass so that said zero position corresponds to an offset magnetic bearing.

Another object of our invention is to provide an indicator moved by the manually operable means for adjusting the zero position of said magnetic-compass controlled device to show the offset magnetic bearing, or in other words, the desired course.

Yet another object of our invention is to furnish in an automatic navigating system, a differential device having as a part thereof, a multiplying gear train so that the output of said device is a multiple of the input to it. This permits the mechanism controlled by said differential device to move through a greater angular rotation and thereby head the vehicle at an angle which is any convenient selected multiple of the angle off course.

A further object of our invention is the provision of an automatic navigating device having means responsive to the amount of deviation from the desired course for steering the vehicle in such a manner that the vehicle will return to the desired course at a rate proportionately greater than the amount of said deviation.

An additional object of our invention is to make available an automatic navigational instrument wherein there is a device (operated by the deviation of the craft from its desired course of more than a pre-determined amount) which causes the craft to return to the desired course by a route at right angles or any lesser angle to the desired course.

Further specifying objects of our invention, our novel navigation control means includes structure which varies the direction in which the automatic pilot causes the controls of the aircraft to be operated depending upon the direction or sense in which the aircraft has deviated from the desired course.

Figure 1 is a circuit diagram and schematic view showing the electric connections of one form of our invention.

Figure 2 is a diagrammatic and schematic view showing the mechanical and electric elements of one form of indicator useful in connection with our invention.

Figures 3, 4 and 5 are fragmentary electric circuit diagrams showing various modifications of our invention.

Figure 6A is a circuit diagram and schematic view of another modification of our invention, Figure 6B being a part on a separate sheet.

Figure 7 is a circuit diagram and schematic diagram of another form of our invention employed for indicators above.

The following embodiment of our invention is selected for the purposes of illustration and explanation. On the aircraft or other vehicle, which is to be controlled by the device of our invention, there is provided:

a. A gyro-stabilized magnetic compass 10 or other form of a stabilized magnetic compass, such as an earth inductor compass.

b. An automatic bearing radio compass 25.

c. An indicator 1 with magnetic indicator 24 and "Selsyn" 115 and 116, and with radio magnetic bearing indicator 48 and "Selsyn" 134 and 135.

d. A course setting mechanism consisting of knob 3, "Selsyn" 77—78, "Selsyn" 177—178, and switch 66, 67, 68, with brake 61—62 and differential gear 6, 6a, 5, 5a.

e. As is seen in Fig. 6, the navigating mechanism consisting of pair of gears 36, 36, "Selsyn" 120—121, "Selsyn" 220 with locked rotor 221, commutator 32—33, relays 40—41 and 42, "Selsyn" 18 with rotor 17, coil 501, torque amplifier 46 and motor 502 connected to speed generator 503 and to turn knob of the automatic pilot.

The mechanism when installed is aligned so that when aircraft is headed "North" and towards a radio station and dial 2 is set to "North" the pointers 24 and 48 point to a fiducial mark 101, secured to the aircraft.

When operating, a voltage is induced in flux gate coil 9 depending on the position of the magnet in gyrostabilized magnetic compass 10. This voltage is transferred to coils of "Selsyn" 8 and induces a voltage in rotor 7 of "Selsyn" 8. Voltage from rotor 7 is transferred to torque amplifier 11 which causes motor 12 to turn clockwise or counterclockwise depending on the phase of voltage in rotor 7. Motor 12 through pair of gears 13 turns shaft 113 which thru differential gears 5, 5a, 6, 6a, clutch 61 and error corrector 214 turns shaft 213, 313 and rotor 7 until the voltage induced in rotor 7 by the gyrostabilized magnetic compass is zero. Shaft 113 may be turned with any desired torque, depending upon the size of motor 12. Secured to shaft 113 is: rotor 15 of "Selsyn" 15—16; rotor 17 of "Selsyn" 17—18; and stator 19 holding stator coils 22 of "Selsyn" 22—23.

Automatic bearing radio compass 25 is connected mechanically to rotor 26 of "Selsyn" 26—27, thus the voltage induced in coils 27 depends on the heading of the aircraft with respect to the radio station. Voltage from coils 27 is fed to stator coil 22 of "Selsyn" 22—23 through slip rings on stator frame 19. The voltage induced in coil 23 depends on the position of stator frame 19 determined by the gyrostabilized magnetic compass and on the aircraft's heading relative to the radio station by virtue of the voltage induced in coils 22. Voltage from coil 23 is transferred to torque amplifier 28 which causes motor 29 to rotate shaft 31 clockwise or counterclockwise (depending upon the phase of voltage in coil 23) until voltage from rotor 23 mechanically secured to shaft 31 is zero.

Shaft 31 therefore takes a position depending on the heading of the aircraft relative to the radio station and to north.

Indicator 1 consists of a fiducial mark 101, on the case of the instrument secured to the aircraft in which is mounted a compass card 2, which may be rotated by knob 3. In front of the card is mounted the pointer 24 in the shape of the vehicle, such as an airplane, and secured by shaft 102 to rotor 115 of "Selsyn" 115—116. Because "Selsyn" 115—116 is connected to "Selsyn" 15—16, the pointer 24 will indicate the position of shaft 113 whose position in turn depends on the positioning of the magnetic compass and the setting of compass card 2. Knob 3 rotates compass card 2 and shaft 113 relative to shaft 213 as will be explained later.

In front of pointer 24 is mounted pointer 48 secured by shaft 103 to rotor 134 of "Selsyn" 134—135. Because "Selsyn" receiver 134—135 is connected to "Selsyn" transmitter 34—35 of which rotor 34 is secured to shaft 31 the pointer 48 indicates the position of shaft 31 whose position in turn depends on the combination of radio and magnetic bearings and the position of card 2. Since pointer 48 indicates the radio magnetic bearing, the position of the pointer 48 depends on the location of the aircraft relative to the radio station and not upon the heading of the vehicle. If the vehicle (such as aircraft) is steered in a small circle the pointer 48 will remain fixed. However, pointer 24 will turn in relation to the heading of the vehicle.

In front of pointer 48 is mounted the dial glass of the indicator on which are etched two vertical parallel lubber lines. These lubber lines assist the operator of the aircraft to quickly concentrate on the desired course on dial 2 which is set up between the lubber lines.

The desired course is set up as follows: On the aircraft there is provided a support which forms part of the case of the indicator 1 on which is a fiducial mark 101. Beneath the fiducial mark 101, is a compass calibrated dial 2 rotated by knob 3 which is connected by shaft 4 to pair of gears 55 mechanically secured to rotor 77 of "Selsyn" 77—78, which in turn is electrically connected to "Selsyn" 177—178. When the operator of the vehicle desires to set a course he operates switch 66, 67, 68 to the "Adjust" position and rotates knob 3. Switch 66 operates brake 62, permits gears 60 to rotate and locks shaft 213 by braking 62 against 61; switch 67 connects torque amplifier 11 to rotor 177. Rotating knob 3 rotates dial 2 and rotor 77 which induces a voltage in rotor 177 indirectly through stators 78 and 178 of "Selsyns" 77—78 and 177—178 respectively. Voltage from rotor 177 is applied through switch 67 to torque amplifier 11 and motor 12 which operates through gears 13 to turn shaft 113, differential gears 6a, 5, 6, 5a and pair of gears 60 which is connected to coil 177. When coil 177 is rotated by the motor until the induced voltage is zero, the motor ceases to operate and the shaft 113 is aligned with dial 2. Operating switches 66, 67 to "Operate" position unlocks shaft 213 and locks gears 60 and thereafter the magnetic compass controls the position of the shaft. Switches 66, 67 are ganged by link 68 and may be ganged with knob 3 so that dial 2 cannot be turned without rotating shaft 113.

The navigating mechanism operates as follows: Referring to Figure 1, (one form of our device), shaft 113, turns in accordance with the magnetic compass or the heading of the aircraft as has been explained. Shaft 113 is secured to case 19 holding stators of "Selsyns" 20—21 and 22—23. Shaft 31 turns with respect to the radio magnetic bearing of the aircraft as has been explained and its turning is independent of the heading of the aircraft. The position of shaft 31 depends on the position of the aircraft relative to the radio station. If the position of the aircraft is greater than 22½ degrees from the desired course set up on dial 2 and fiducial mark 101 of indicator 1, then rotatable switch 32 is in such a position that stator of "Selsyn" 17—18 is connected through contacts 38, 39 of relay 40—41 to stator "Selsyn" 44—45. Rotor 17 of "Selsyn" 17—18 is displaced 90° from north on shaft 113. Voltage from rotor 45 is connected to torque amplifier 46 which causes motor 47 to rotate the turn knob of the directional gyro of the automatic pilot. This causes the automatic pilot to turn the rudder and in so doing causes the follow-up pulley in back of the directional gyro to turn the follow-up card of the directional gyro to stop the rudder from turning. The follow-up pulley is secured to rotor 45 of "Selsyn" 44—45 so that at the same time rotor 45 will be rotated and the voltage is reduced to zero thus stopping motor 47 from rotating the turn knob. However, the rudder or guiding mechanism of the aircraft is displaced, and the aircraft keeps turning. As it turns, rotor 17 of "Selsyn" 17—18 turns and motor 47 follows the turning motion thus bringing the turn knob back so that when the aircraft is headed 90° to the desired course the rudder is brought back to a neutral position, and the aircraft is headed toward the desired course. If the heading of the aircraft exceeds 90°, then rotary switch 33 causes relay 42 to operate thus reversing leads to "Selsyn" 44—45 causing motor 47 to reverse, and keeping the aircraft 90° to the desired course. As the aircraft moves towards course, the angle off course is reduced until, when it is less than 22½ degrees, rotary switch 32 causes relay 40—41 to operate and close contacts 37 and 39 thus connecting "Selsyn" 20—21 to "Selsyn" 44—45, and motor 47 will rotate the turn knob as described above. However, in this case the amount of turning depends on "Selsyn" 20—21 connected to shaft 31 thru gears 36 which in this case is a 4 to 1 ratio. Thus the aircraft is permitted to turn until the heading angle is four times the angle off course. By selecting 22½ degrees as the change over point there is a smooth transfer from 90° heading to four times amount off course. As the angle is reduced to zero the heading approaches zero and the aircraft is headed towards the radio station.

Referring to Figure 2, there is shown a navigation indicator which forms a part of our invention. This indicator consists of a casing 100 mounted on support 1. Card 2 is mounted for rotation relative to casing 100 and to marker 101, forming a part thereof. Indicator 24 is rotatably mounted relative to card 2 and is turned by rotor 115 by means of tube 102. Pointer 48 is also rotatably mounted relative to card 2 and turned by rotor 134 by means of rod 103. Knob 3 by means of cable 4 and gears 144, turns rotor 77 of "Selsyn" 77—78.

Figure 3 shows a portion of the circuit shown in Figure 1 modified to suit another type of automatic pilot, in this case the type commercially known as "Sperry" A-2, -3, or -4, employing a cage rudder gyro. This gives control by using bank only. In this modification "Autosyn" 44—45 causes motor 47 to rotate bevel gears 110 and slip clutch 111 having stops 112, and the aileron knob 147 of the automatic pilot 149.

Figure 4 shows another modification also employing the automatic pilot commercially known as "Sperry" A-2, -3, or -4. In this modification, the control surfaces of the craft are operated directly using the follow-up shown, the control being exercised by means of a flat turn. Accordingly motor 47 directly operates turn knob 247 of the automatic pilot 149. Rotor 45 is connected to follow-up pulley 248 which in turn is connected to rudder cable 249 and as the rudder is turned, rotor 45 is rotated so that the induced voltage is zero thus stopping the motor 47.

Figure 5 shows a fragment of the circuit shown in Figure 1 modified to employ an electric pilot of the type commercially known as "Sperry" A-5, A-6, etc. In this modification a "Selsyn" has a locked rotor 145 and a stator 144. The voltage output of rotor 145 is fed through amplifier 143 to the rudder amplifier 142 and the aileron amplifier 141 of the automatic pilot generally indicated at 349 which also includes an elevator amplifier 140.

Figure 6 shows yet another embodiment of our invention, similar to that shown in Figure 1 in which the same elements have been designated by the same reference characters. In this embodiment the electrical voltage related to the angle off the desired course is compared with the electrical voltage related to the heading. A different connection to the automatic pilot employing control of turn and bank is illustrated and equally applicable to the circuit of Figure 1.

In this embodiment, however, casing 19 only carries stator 22 of "Selsyn" 22—23. Shaft 31 by means of gears 36 turns rotor 121 of "Selsyn" 120—121. Stator 120 is connected to stationary contacts 37. Contacts 38 are connected to stator 220 of "Selsyn" 220—221 having locked rotor 221 which is normally set to produce a voltage equivalent to that of rotor 121 when turned 22½°, or 90° off course. Depending on position of rotary switches 32 and 33, "Selsyn" 120—121 or "Selsyn" 220—221 is connected to control the turning mechanism as explained for Figure 1, "Selsyn" 220—221 being connected where the airplane is more than 22½ degrees from course and "Selsyn" 120—121 being connected where the airplane is less than 22½ degrees from course and causing airplane to head at an angle four times angle off-course by virtue of gear ratio selected by gears 36. As explained for Figure 1, rotary switch 33 reverses relay 42 to cause the airplane to follow a course 90° to the desired course. Voltage from "Selsyn" 120—121 or 220—221 is applied to "Selsyn" 17—18 and high impedance "Selsyn" 44—45. Rotors 17 and 45 are connected in reverse and when a voltage is induced it is applied thru "Selsyns" 17—18, 44—45 and transformer 501 to torque amplifier 46 which causes motor 502 to rotate the turn knob of the directional gyro of the automatic pilot clockwise or counterclockwise depending on the phase of the induced voltage. As the turn knob is rotated the rudder of the aircraft is turned causing cable on follow-up pulley to follow and rotate shaft 148 which brings the follow-up card in the automatic pilot back to neutral, and rotates rotor 45 so that the induced voltage is zero and the motor 502 stops turning.

The speed generator 503 on shaft 47 is connected back to the input of the torque amplifier 46 through transformer 501 and prevents hunting.

To prevent skidding, it is desirable to bank the aircraft when a turn is made. Bank may be provided by various methods, one of which is illustrated as follows: As shaft 47 rotates thus turning the turn knob, voltage from speed generator 150 is applied to torque amplifier 151 which energizes motor 152. Motor shaft 153 rotates the aileron knob thru ratio box 154 and shaft 155. The speed ratio may be changed by knob 156. Stops are also provided in box 154 to limit the amount of bank. The voltage from 150 and likewise the angular rotation of the aileron knob is dependent on the rate of change in angular rotation of shaft 47. Torque amplifier 151 is biased so that when the voltage from 150 is zero, the ailerons are brought back to neutral and as the amplitude and phase of voltage from coil 150 changes, a proportional amount of right or left bank is applied. The connection to the aileron knob may be thru a slip clutch to permit trimming. This combination of turn and bank results in a smoother, quicker and more comfortable turn.

Figure 7 is another embodiment of our invention using the same reference characters insofar as possible, and illustrating the use of our device for navigational indications alone. Referring to Figure 7 the stabilized magnetic compass 10 is connected to "Selsyn" 115—116. Rotor 115 rotates shaft 102 and airplane pointer 24 which indicates the magnetic heading on dial 2. The magnetic compass 10 is also connected to winding 216 of differential "Selsyn" 127—216. The automatic bearing radio compass 25 and "Selsyn" 26—27 are connected to the winding 127 of differential "Selsyn" 127—216. By virtue of the differential effect between windings 127 and 216, pointer 48 with respect to dial 2, provides the radio magnetic bearing, and pointer 48 is not rotated by changing the heading of the aircraft. If desired the desired course may be set up between the lubber lines by manually rotating knob 3 which rotates dial 2 and shaft 4. Shaft 4 is geared to the casing holding coils 9 of the stabilized magnetic compass. Compensating magnets may be provided on the fixed position of the case to permit correction for magnetic errors due to objects in the vicinity of the compass.

While our device is navigating the aircraft or operating and not steering, the indicator by itself provides indication of:

a. Desired course by means of lubber lines on the glass in front of the dial. The desired course may be set up under the lubber lines and the indication may be corrected for east or west magnetic bearing by correct rotation of the course setting knob 3. This indication is remote from the generating device.

b. Magnetic compass bearing or vehicle heading by means of indicator 24 in the shape of the aircraft. This indicator is remote from the generating device.

c. Radio magnetic bearing of the radio station by means of an arrow-shaped pointer 48 in conjunction with a movable card 2.

d. The angle of drift by means of the angular relation of the aircraft pointer 24 and the arrow pointer 48 when the arrow pointer is between the parallel lubber lines.

The aircraft may be steered manually to proceed along a substantially drift free track, by means of the indication alone. If a device for indication alone is desired the automatic control features and torque amplifiers may be omitted (see Fig. 7), the stabilized magnetic compass and radio compass operating directly into a differential "Selsyn" for the arrow pointer, the magnetic compass operating directly into the aircraft pointer "Selsyn." The desired course may be set up under the lubber lines by means of knob 3 recaging stator of flux gate transmitter 9—10, the compensating magnets being used to correct magnetic deviations.

"Selsyn" is a trade-mark owned by the General Electric Company and is defined in this specification as any self-synchronous motor or transmitter used for indicating position remotely.

Magnetic compass as herein referred to means: any type of device operating by the earth's magnetic field and stabilized so that it is not disturbed by movements of the craft.

We do not intend to be limited in the practice of our invention save as the scope of the annexed claims may require.

We claim:

1. In a navigational instrument to be mounted on a movable craft, a directional compass, manually operable means mechanically connected to adjust the output of said directional compass to provide an offset directional bearing representing the instantaneous directional heading of said craft relative to the desired course, an automatic bearing radio compass, a device connected under the control of said compasses in which the bearing due to said radio compass and said offset bearing of the directional compass are combined to provide an output proportional to the angle of departure of said craft from the desired course through a chosen radio station, an automatic pilot connected to the controls of said craft to operate said controls whenever said pilot is moved out of neutral position, an electric circuit connecting the adjusted output of said directional compass and said automatic pilot, a second electric circuit connecting said device and said automatic pilot, a relay connected to control the opening and closing of said electric circuits, and an electric switch mounted under the control of said device to connect said automatic pilot to the adjusted output of said directional compass when the angle of departure is more than a predetermined amount and to connect said automatic pilot to said device when the angle of departure is less than said predetermined amount.

2. In a navigational instrument to be mounted on a movable craft, a directional compass, manually operable means mechanically connected to adjust the output of said magnetic compass to provide an offset directional bearing representing the instantaneous directional heading of said craft relative to the desired course, an automatic bearing radio compass, a device connected under the control of said compasses in which the bearing due to said radio compass and said offset bearing of the directional compass are combined to provide an output proportional to the angle of departure of said craft from the desired course through a chosen radio station, an automatic pilot connected to the controls of said craft to operate said controls whenever said pilot is moved out of neutral position, an electric circuit connecting the adjusted output of said directional compass and said automatic pilot, a second electric circuit connecting said device and said automatic pilot, a relay connected to control the sense in which current is fed through one or other of said electric circuits to said automatic pilot, and an electric switch mounted under the control of said device to move said relay in response to the movements of said radio compass and said magnetic compass.

3. In a navigational instrument to be mounted on a movable craft, a directional compass, manually operable means to adjust an output of said directional compass to provide a directional bearing of said craft relative to a desired course between two points, a radio compass responsive to a transmitter at one of said points, means to obtain the difference between said direction bearing and the output of said radio compass to provide an output corresponding to the angular displacement of the craft from the course relative to said one point, and means to combine a predetermined multiple of said difference with said directional bearing to determine a corrected directional heading and to operate the controls of said craft to follow said corrected heading.

4. In a navigational instrument to be mounted on a movable craft, as in claim 3, means to limit said predetermined multiple to 90° whereby the angle of approach of the craft to the course cannot pass the optimum of 90°.

RICHARD J. FRAMME.
HUBERT G. WOLFF.

REFERENCES CITED

The following references are of record in the file of this patent:

UNITED STATES PATENTS

| Number | Name | Date |
|---|---|---|
| 1,924,257 | Hodgman | Aug. 29, 1933 |
| 1,958,258 | Alexanderson | May 8, 1934 |
| 2,051,974 | Warner | Aug. 25, 1936 |
| 2,272,607 | Higonnet | Feb. 10, 1942 |
| 2,280,117 | Crane et al. | Apr. 21, 1942 |
| 2,321,606 | Lear | June 15, 1943 |
| 2,323,337 | Lear | July 6, 1943 |
| 2,372,184 | Carlson | Mar. 27, 1945 |
| 2,372,185 | Wittkuhns | Mar. 27, 1945 |